US012742533B2

(12) United States Patent
Darlage

(10) Patent No.: US 12,742,533 B2

(45) Date of Patent: Sep. 22, 2026

(54) METHOD AND DEVICE TO DERATE A LIGHT SYSTEM

(71) Applicant: Valeo Vision, Bobigny (FR)

(72) Inventor: Colby Darlage, Troy, MI (US)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 18/975,375

(22) Filed: Dec. 10, 2024

(65) Prior Publication Data

US 2026/0160398 A1 Jun. 11, 2026

(51) Int. Cl.

| | |
|---|---|
| ***F21S 41/663*** | (2018.01) |
| ***F21S 41/148*** | (2018.01) |
| ***F21S 41/32*** | (2018.01) |
| ***F21V 23/00*** | (2015.01) |

(52) U.S. Cl.

CPC ........... *F21S 41/663* (2018.01); *F21S 41/148* (2018.01); *F21S 41/321* (2018.01); *F21V 23/003* (2013.01)

(58) Field of Classification Search

CPC ...... F21S 41/663; F21S 41/148; F21S 41/321; F21V 23/003; F21W 2102/13; F21W 2107/10; F21W 2102/00; F21W 2102/14; F21W 2102/145; F21W 2102/155; F21W 2102/20; F21W 2103/55; B60Q 1/1407; B60Q 1/1415; B60Q 1/1423; B60Q 1/143; B60Q 2300/146; H05B 45/56; H05B 45/48; H05B 45/10; H05B 45/14; H05B 45/18

See application file for complete search history.

(56) References Cited

U.S. PATENT DOCUMENTS

| | | | |
|---|---|---|---|
| 8,754,589 B2 | 6/2014 | Chemel et al. | |
| 9,345,075 B2 | 5/2016 | Yamamichi et al. | |
| 10,306,725 B2 | 5/2019 | Ohta et al. | |
| 12,052,804 B2 | 7/2024 | Taleb | |
| 2014/0175978 A1* | 6/2014 | Kobayashi ............ | F21S 41/635 362/487 |
| 2024/0035639 A1 | 2/2024 | Mochizuki et al. | |
| 2024/0262284 A1 | 8/2024 | Nemoto | |

FOREIGN PATENT DOCUMENTS

| | | | |
|---|---|---|---|
| EP | 2455656 A2 * | 5/2012 | ............ F21S 41/153 |
| WO | WO-2015005377 A1 * | 1/2015 | ............ F21S 41/255 |

OTHER PUBLICATIONS

Search English translation of EP 2455656 A2 (Year: 2012).*

Search English translation of WO 2015005377 A1 (Year: 2015).*

* cited by examiner

*Primary Examiner* — Omar Rojas Cadima

(74) *Attorney, Agent, or Firm* — Young Basile Hanlon & MacFarlane, P.C.

(57) ABSTRACT

A light system with a plurality of light sources configured to generate light that when located within a vehicle form a beam pattern; and a controller in communication with the plurality of light sources and configured to control the plurality of light sources. The beam pattern is divided into two or more zones and the controller is configured to derate one or more of the plurality of light sources so that the beam pattern is changed by the controller derating the one or more of the plurality of light sources.

20 Claims, 7 Drawing Sheets

METHOD AND DEVICE TO DERATE A LIGHT SYSTEM

FIELD

The present teachings relate to a light system including multiple zones and derating all or a portion of one or more of the multiple zones so that power consumption, a thermal load, or both is accordingly reduced with a reduction in light generated by the light system.

BACKGROUND

Vehicles include many different types of lights. Some types of lights included on a vehicle are low beam headlights, high beam headlights, taillights, turn signal lights, fog lights, running lights, or a combination thereof. Each of these lights extend out of an outer surface of a vehicle so that they provide light for the driver or provide notice to surrounding drivers. These light systems generally direct light outward from the vehicle.

Thus, there is a need for a light system that is capable of reducing an amount of light provided to surrounding regions so that an amount of heat generated is controllable, an amount of power consumption is controllable, or both. There is a need for a device and method of reducing an amount of light generated in one or more zones of a light system. There is a need for a device and method where zones of a light system within the device are reduced in intensity by reducing an amount of current provided to the device. It would be desirable to have a method of controlling a light system that reduces a total amount of light output by the light system on a zone by zone basis such that a reduction in light is not noticeable to a naked eye of a user. The present teachings provide a method of derating portions of a system over time until the system achieves a steady state temperature.

SUMMARY

The present teachings provide: a light system with a plurality of light sources configured to generate light that when located within a vehicle form a beam pattern; and a controller in communication with the plurality of light sources and configured to control the plurality of light sources. The beam pattern is divided into two or more zones and the controller is configured to derate one or more of the plurality of light sources so that the beam pattern is changed by the controller derating the one or more of the plurality of light sources.

The present teachings provide: a light system with a controller. The controller configured to: provide current to two or more light sources of the light system so that a beam pattern is formed around a vehicle housing the light system. The controller is configured to measure a current or temperature of the light system. The controller is configured to derate one of the two or more light sources so that a shape of the beam pattern, a brightness of the beam pattern, or both is reduced relative to a beam pattern is generated when full current is provided.

The present teachings provide: a process including generating a beam pattern with a plurality of lights within a light system; and derating one or more of the plurality of lights so that a shape of the beam pattern, a brightness of the beam pattern, or both are changed. Some of the plurality of lights remain unchanged when one or more of the plurality of lights are derated.

The present teachings provide a need for a light system that is capable of reducing an amount of light provided to surrounding regions so that an amount of heat generated is controllable, an amount of power consumption is controllable, or both. The present teachings provide a device and method of reducing an amount of light generated in one or more zones of a light system. The present teachings provide a device and method where zones of a light system within the device are reduced in intensity by reducing an amount of current provided to the device. The present teachings provide a method of controlling a light system that reduces a total amount of light output by the light system on a zone-by-zone basis such that a reduction in light is not noticeable to a naked eye of a user. The present teachings provide a method of derating portions of a system over time until the system achieves a steady state temperature.

DETAILED DESCRIPTION

Figure 1A:
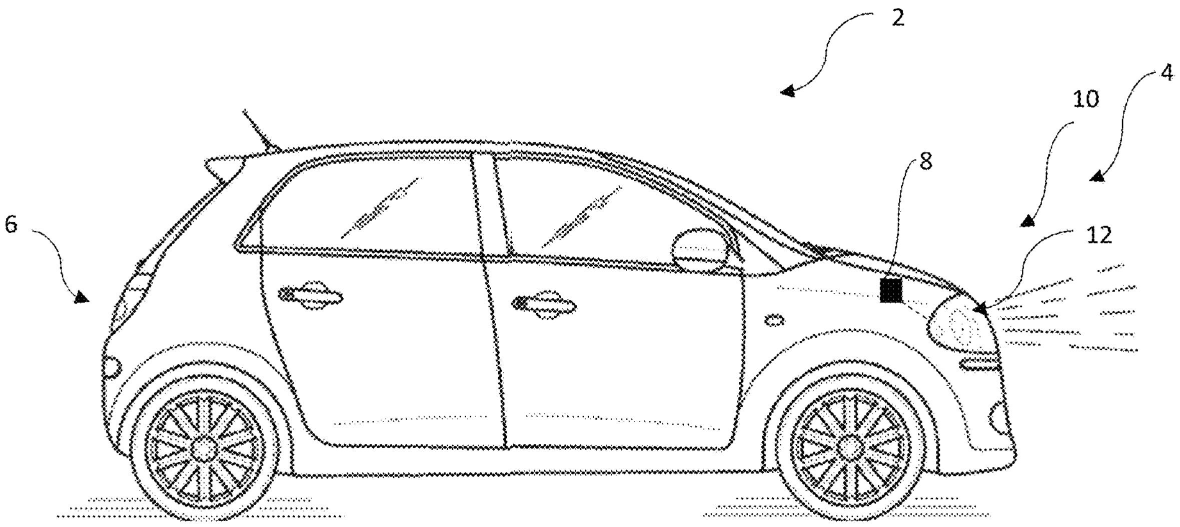
FIG. 1A is a side view of a vehicle including a light system.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings relate to a light system. The light system is located within a vehicle. Preferably, the light system is part of a vehicle such as a car, motorcycle, bus, truck, semi-truck, SUV, XUV, four-wheeler, dirt bike, tractor, combine, heavy equipment, farm equipment, industrial equipment, commercial equipment, or a combination thereof. The light system may project light in a forward direction, rear direction, side direction, vertical direction (e.g., z-axis), from a fore to an aft, an aft to a fore, or a combination thereof. Preferably, the light system projects a light from an external surface of the vehicle to a location in front of the vehicle or at an angle relative to the front or rear of a vehicle.

The light system may direct some light at the ground. The light system may direct some light above the ground. The light system may be integrated into a front end, a rear end, or both of a car. The light system may be an assembly. The light system may be a sealed light system that is integrated into a vehicle (e.g., in a vehicle that houses the light system). The light system may be a sub-assembly that is included in a larger light system. The light system may be integrated into another light system and may function to be part of the light system. The light system may include multiple different lights or light sub-systems that each provide light. The light systems may be multiple light systems or light sources stacked one above the other, side by side, within different planes, within a same plane and projecting in different direction, integrated into a single light system, or a combination thereof. The light system may have multiple smaller light systems or light sources that generate light or light patterns.

The lights may be physically divided, electrically divided, or both into two or more zones, three or more zones, four or more zones or a plurality of zones. The lights may be spaced apart along a printed circuit board. The lights may be located adjacent to one or more reflectors so that the reflectors are located to and receiving light from the lights. The reflectors may physically separate the lights from one another. The light (e.g., beam pattern) may be divided into zones that are located on each side of a vehicle. For example, the vehicle may be divided down a centerline along its length and two or more zones, three or more zones, or four or more zones may be located on each side of the centerline. Some or all of the zones may be physically divided, electrically divided, or both into sub-zones such that each of the zones may have multiple regions that are individually controllable (e.g., sub-zones). Thus, each zone may be divided into one or more sub-zones, two or more sub-zones, three or more sub-zones, four or more sub-zones, or ten or less sub-zones. The sub-zones may be individually controllable. The sub-zones may be formed by facets on the reflector. The facets may direct light to a predetermined region (e.g., sub-zone) when the light is fully illuminated and the facts may direct light to a different region (e.g., different region of the sub-zone) when the light is less then completely illuminated. The light systems may be covered by or include one or more outer lenses so that light from the zones, sub-zones, or both extend through the outer lenses.

The light system may be free of an outer lens. The light system may be free of a protective outer layer. The light system may include an outer lens that forms an exterior of the light system. The outer lens may form an outer most surface of the light system. The outer lens may function to protect all or a portion of the light system. The outer lens may have an outer surface (e.g., "A-side") and an inner surface (e.g., "B-side" or back side). The B-side of the outer lens may cover or face one or more lights or a plurality of lights. The B-side of the outer lens may directly cover the lights.

The plurality of light systems, lights, zones, sub-zones, or a combination thereof may be part of one light system and may produce a beam pattern. The beam pattern may be controllable on a zone-by-zone basis. The beam pattern may be controllable based upon a sub-zone by sub-zone basis. The zones may be divided into a priority basis. The outer zones may be a first priority to derate, the middle zones may be a second priority to derate, and the outer zones may be a third priority. The sub-zones may be divided by priority beginning at an outside of the beam pattern towards an inside of the beam pattern relative to a centerline of a vehicle and a distal end of the beam pattern towards a proximal end of the beam pattern relative to the vehicle. Thus, the light directly in front of the vehicle may be the last area of light derated if at all.

First outer zone and second outer zone function to form the outer edges of the beam pattern. The first outer zone and the second outer zone (e.g., outer zones) form bookends of the beam pattern relative to the centerline of the vehicle. The first outer zone may be located on a left outside of the beam pattern relative to a front of the vehicle and a direction of motion. The second outer zone form a right outside of the beam pattern relative to a front of the vehicle and a direction of motion. The outer zones may be located entirely outside of a width of a vehicle. The outer zones may have a geometric shape that is formable by a light, reflectors, or both of the light system. The outer zones may form a shape that is a triangle, diamond, trapezoid, equilateral triangle, isosceles triangle, scalene triangle, acuate triangle, right triangle, obtuse triangle, or a combination thereof. The outer zones may form about 5 percent or more, 10 percent or more, 15 percent or more, or 20 percent or more of the total area of the light pattern. The outer zones may form about 40 percent or less, 30 percent or less, or about 25 percent of the total area of the light pattern. The area of the outer zones may be reduced as the outer zone is derated. Thus, for example, the outer zones may begin at 25 percent and be derated to 15 percent. The first outer zone and the second outer zone may be symmetrically represented by area about the center line of the vehicle. Thus, if the first zone is 12.5 percent by area the second zone may be 12.5 percent of the total area. The outer zones may be free of abutting anything on one side. The outer zones may be in direct contact with a middle zone one side. The outer zone may be a sub-zone of the middle zone.

The first middle zone, the second middle zone, or both (e.g., middle zones) form a central portion of a light pattern. The middle zones are sandwiched between an outer zone and a center zone. The middle zones extend from a side of the vehicle towards a center of the vehicle. The middle zones may be a largest zone of the beam pattern. The middle zones may represent an area of the beam pattern that is about 25 percent or more, about 35 percent or more, about 45 percent or more, or about 55 percent or more (e.g., ±5 or ±2) of a total area of the beam pattern. The middle zones may represent an area of the beam pattern that is about 75 percent or less, 70 percent or less, about 65 percent or less, or about 60 percent or less by total area. The middle zones may have a geometric shape. The middle zones may be shaped like a triangle, trapezoid, pentagon, rectangle, parallelogram, a symmetrical shape, an asymmetrical shape, or a combination thereof. The middle zones may be derated from a location adjacent to the outer zones towards the centerline and from a distal end of the beam pattern towards a proximal end of the beam pattern (e.g., towards the vehicle). The middle zones may be derated after the outer zones. One or both of the middle zones may begin to be derated when one or both of the outer zones are derated about 25 percent or more, 35 percent or more, or about 50 percent or more.

The middle zones may be derated sequentially, progressively, fluidly, or a combination thereof. Thus, the middle zones may not be derated by an integer, the middle zones may be derated by a fraction of a percent. The sub-zones may be derated differently based upon a location of the sub-zone within the middle zones (e.g., the sub-zones may be adjustable by a controller). Distal sub-zones may be derated before proximal sub-zones. Sub-zones closest to the outer zones may be derated before sub-zones closest to sub-zones closer to the center zones. Thus, one sub-zone could be derated 15 percent while other sub-zones are derated 0 percent. The first middle zone and the second middle zone may be derated equally, disproportionally, in parallel, in series, or a combination thereof. The first middle zone may be derated more than the second middle zone or vice vera. The first middle zone may be derated and the second middle zone may not be derated at all. The middle zones may be derated diagonally away from the outer zones towards the center zones and the vehicle.

First center zone, second center zone, or both (e.g., center zones) function to direct light forward of a vehicle to illuminate objects in a direction of travel of the vehicle. The first center zone may be light that is aimed directly in front of the vehicle and within a width of the vehicle. The first center zones may be the last area of light to be derated. The first center zones may project light parallel to a center line of the vehicle. The center zones may be located on opposing sides of the center line. The center zones may have a geometric shape. The center zones may be rectangular, square, triangular, trapezoidal, a parallelogram, or a combination thereof. The center zones may project more light to a location distal of the vehicle than proximal to the vehicle or vice versa. For example, the light may have a shape where the base of the triangle is located adjacent to the vehicle and a point is located opposite the vehicle, or vice versa. The center zones may be derated after the outer zones, the middle zones, or both. The center zones may be the last zones derated. If the center zones are derated then the center zones may be derated at a rate slower than then outer zone, the middle zone, or both. For example, deration may be one at rate of about 1 percent per unit time or less, 0.5 percent per unit time or less, 0.25 percent per unit time or less, or 0.1 percent per unit time or more (e.g., hundredths of a second, tenths of a second, a second). The center zones, the middle zones, the outer zones, or a combination thereof may be divided into sub-zones.

Each of the first zones, second zones, or both may be divided into one or more sub-zones or a plurality of sub-zones. Each zone may include two or more sub-zones, three or more sub-zones, five or more sub-zones, seven or more sub-zones, or even ten or more sub-zones. Each zone may include twenty or less sub-zones, fifteen or less sub-zones, or twelve or less sub-zones. Some of the sub-zones may overlap two or more zones based on how the light is directed from the light system.

The plurality of light systems may operate independently of one another such that one light system may not affect another light system or portion of the light system. The light system may provide light with one or more colors, two or more colors, three or more colors, four or more colors, or a combination thereof. The light system may illuminate a region around a vehicle (e.g., a portion of a front of the vehicle or a portion of a rear of the vehicle). Some of the zones may be free of sub-zones. The sub-zones may be individually controllable. The sub-zones may be controlled such that only that sub-zone is derated and the surrounding sub-zones remain unaffected. A sub-zone may be derated from a distal end towards a proximal end (e.g., front to back), a passenger side towards a center (e.g., left to right), a driver side towards a center (e.g., right to left), or a combination thereof. Each sub-zone may have light varied therein by a controller that changes an amount of light produced by light sources that direct light into a corresponding sub-zone. For example, one light source may direct light to a sub-zone and a controller may vary an amount of light directed into the sub-zone.

The controllers function to control the light sources or the lights within a light source individually. The controller may be part of the vehicle, part of the light system, or both. A single controller may control all of the lights. The controller may illuminate (e.g., fire) the light sources in a sequence, individually, in a pattern, a predetermined manner, a predetermined sequence, randomly, or a combination thereof. The controller may derate one or more of the light sources. The controller may reduce an amount of light directed out of the one or more light sources (e.g., lights) of the light system. The controller may begin derating (e.g., dimming) the lights at a location outside of the field of view of the driver, outside of a width of the vehicle, from a distal location, or a combination thereof. The controller may be accessed inside of the vehicle so that the user can change the illumination settings of the light system. The controller may communicate with light sources through one or more printed circuit boards. The controller may be pre-programmed to control an amount of current, power, voltage, or a combination thereof used by the light system, the lights, or both. The controller may be pre-programmed to control heat within the light system, heat of individual lights, or both. The controller may control the current, the heat, or both of the light system. The controller may control the light system by derating (e.g., dimmed or reduced) one or more lights so that a current consumed, heat produced, or both are varied. The amount of control to one or more lights of the light system may vary from no control (e.g., no deration) to full control (e.g., all or a portion of a light is turned off or dimmed).

The controller may fully illuminate the light system upon starting up the light system or the lights turning on. The controller may continuously monitor the light system to determine if the light system exceeds a predetermined maximum temperature, a predetermined maximum current, or both. The light system may first be free of any derating (e.g., reduction in power or dimming). If the controller determines that the light system exceeds or approaches a predetermined maximum temperature, a predetermined maximum current, or both then the controller may employ a control process discussed herein.

Once the controller determines that the light system is approaching or has reached the predetermined maximum temperature, the predetermined maximum current, or both, the controller may begin to derate the light system. The controller may begin controlling from no derating to low derating. As discussed, above the light system may be derated from back to front, outside to inside, or both. The controller may begin derating by reducing current to one light of the light system at a time. The controller may reduce current and/or power by about 0.1 percent or more, about 0.25 percent or more, about 0.5 percent or more, or about 0.75 or more per unit time (e.g., hundredths of a second, tenths of a second, or even a second). The controller may reduce current and/or power by about 5 percent or less, 3 percent or less, or about 1 percent or less per unit time. A rate of reducing current and/or power may vary depending on the rate of change of the temperature, the amount of current used over a predetermined amount, or both. For example, if the temperature is rising non-linearly then the rate of derating may be non-linear until the temperature stabilizes of drops below a predetermined maximum current and/or temperature. The controller may control based upon how close the light system is to a measured condition (e.g., heat or current). For example, the controller may be more aggressive if the light system is at the measured condition versus approaching the measured condition. The controller may control via proportional, integral, derivative, or a combination thereof control schemes. The controller may begin by controlling one zone or sub-zone, a pair of zones or sub-zones, or both from no deration to a low deration. The low deration may be reducing the amount of power and/or light by about 1 percent or more, about 3 percent or more, about 5 percent or more, about 7 percent or more, or about 10 percent or less based on a total amount of light and/or power. The controller may control the light system to low derate the same as the controller controls to light derate, dark derate, full derate, or a combination thereof.

Once the controller controls one or more lights of the light system to a low deration, the light system may begin derating other lights of the light system or the controller may further derate the light to a light derate. The controller may control to a light derate by reducing the amount of light generated from the low derate but stopping before the lights are at a dark derate. The light derate may be the amount of light generated being reduced from about 7 percent to 10 percent to about 15 percent or more, 17 percent or more, about 20 percent or more, or about 23 percent or more of the total about of light. The light derate may derate an amount of light generated to about 35 percent or less, about 30 percent or less, or about 25 percent or less. The controller may control the light system in a same manner as the controller controls from no derate to light derate. Once light derate of a light is achieved then the light system may begin to derate a different light or lights of the light system or may continue to derate the same light from a light derate to a dark derate.

The controller may begin derating at the light derate (e.g., about a 25% reduction) to a dark derate (e.g., about 50% reduction). Dark deration may be a reduction in an amount of light by about 30 percent or more, 35 percent or more, about 40 percent or more, or about 43 percent or more of the total light. Dark deration may be a reduction in an amount of light by about 60 percent or less, about 55 percent or less, about 50 percent or less, or about 45 percent or less of the total amount of light. The controller once controlling some of the lights to dark deration may begin derating one or more other lights, may continue to derate the lights that are at dark derate, or both.

The controller may begin derating at the dark derate (e.g., about 50% reduction) to a full derate (e.g., about a 75% reduction). Full deration may be a reduction in an amount of light by about 50% or more, about 55% or more, about 60% or more, or about 70% or more. Full deration may be a reduction in an amount of light by about 90% or less, about 85% or less, about 80% or less, or about 75% or less. At full derate portions of a zone or sub-zone may be completely dark, completely lit, reduces in brightness, or a combination thereof. Full derate may have a gradient that extend from fully dark at one end and fully lit at a second end. The fully dark portion may be a region is outside and distal from the vehicle. The fully lit portion may be a region that is inside and proximal to the vehicle.

The teachings herein may control a light so that the beam pattern is varied by reducing a light output of one or more lights of a light system. A process of controlling a light system may begin by fully creating a beam pattern of a light system. The controller may monitor a temperature, current draw, or both of the light system. The process may derate one or more lights of a light system, one or more zones of a light system, or both. The process may begin by derating a first outer zone, a second outer zone, or both (e.g., or a corresponding sub-zone of a zone). The process may derate a first outer zone, a second outer zone, or both a second time. The outer zones may be derated multiple times before other zones are derated. The process may move from an outer zone to a middle zone. The process may derate a first middle zone, a second middle zone, or both a first time, a second time, a third time, or more times. The middle zones may be derated once the outer zones achieve a predetermined amount of derate, a full derate, or both. The middle zones may be derated one at a time. The middle zones may be sequentially derated (e.g., a first middle zone then a second middle zone or vice versa) until a predetermined temperature, predetermined current, a maximum derate, or a combination thereof is achieved. One middle zone may be derated from one deration level to another deration level before a second middle zone is derated. The controller may alternate between the first outer zone, second outer zone, first middle zone, and second middle zone before fully derating any one of the lights. The first center zone, the second center zone, or both (e.g., center zones) may be derated last. The center zones may be the least derated zones. The center zones may only be derated to a light derate. The outer zones, the middle zones, the center zones, or a combination thereof may be derated as sufficient amount that current, heat, or both may be reduced or lowered while a naked eye of a driver may not be able to visually see the reduction in light of the beam pattern. The controller may increase an amount of light after deration if the current or heat is below a predetermined amount in order to provide more light to the regions derated. The controller may increase light in a reverse order that the controller derates the light.

FIG. 1A illustrates a side view of a vehicle 2 including light systems 10. The light systems 10 provide light around the vehicle 2. The light systems 10 are located at a fore 4 end of the vehicle 2 but could be located at an aft 6 of the vehicle 2. The light systems 10 include an outer lens 14 that protects the light system 10. The light systems 10 may be controlled by one or more controllers 8 jointly or individually.

Figure 1B:
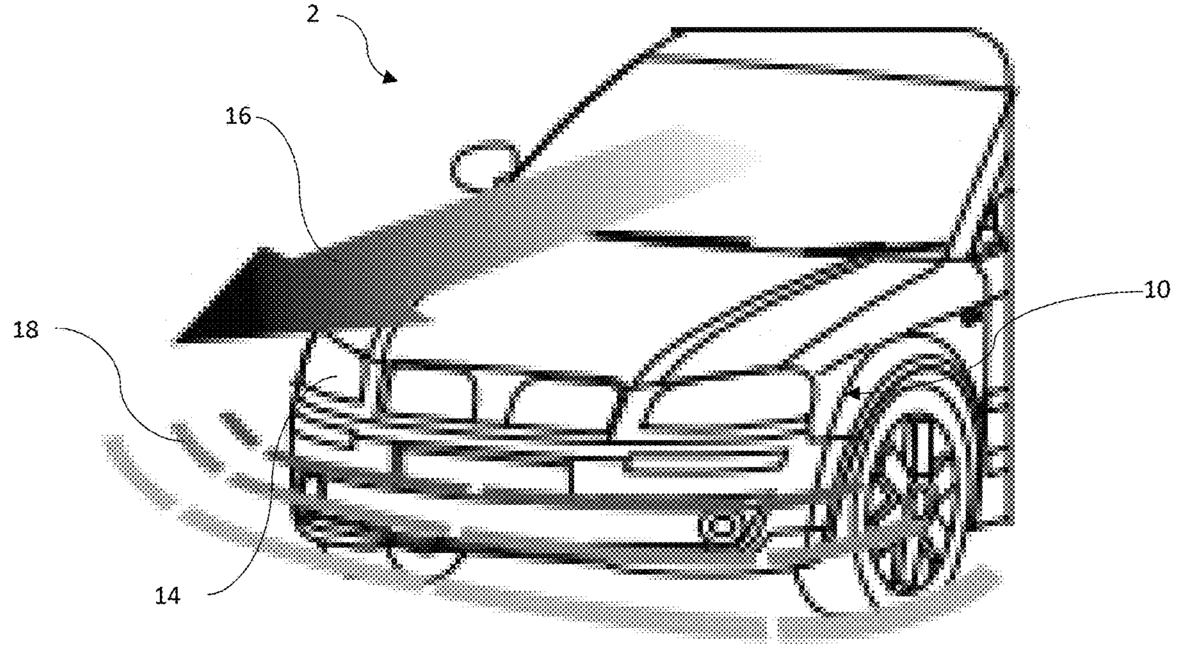
FIG. 1B is a front view of a light system including an illuminated component.

FIG. 1B is a forward end of the vehicle 2. The forward end includes light systems 10 that includes an outer lens 14 that is an outermost portion of the light systems 10. The light systems 10, as shown, face in a direction of motion 16 and directs light in the direction of motion 16 (e.g., a first direction that is outward relative to the light source) as shown by the visible light 18 extending away from a forward end of the vehicle 2 (or any other side/end of the vehicle 2 including an illuminated component).

Figure 2A:
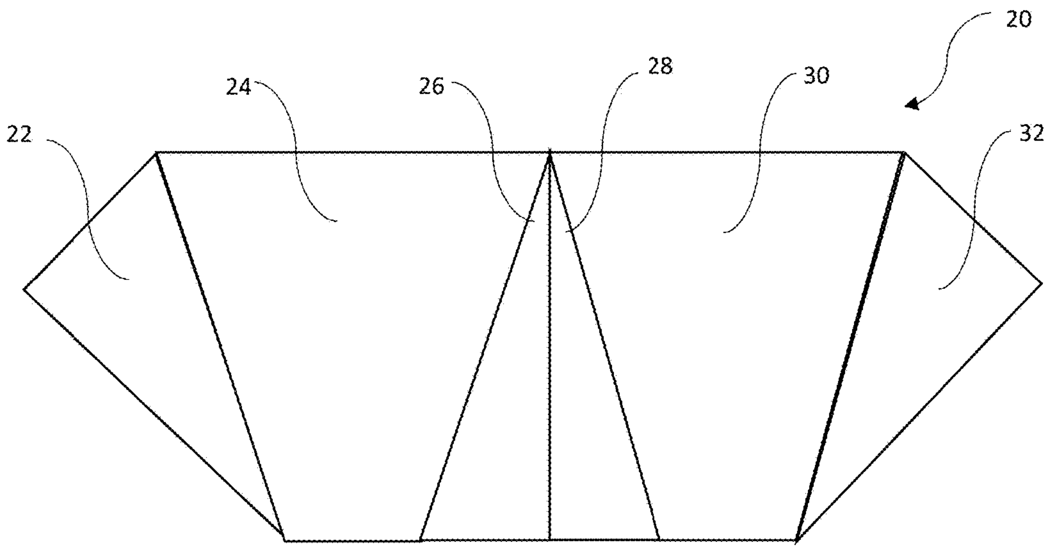
FIG. 2A illustrates an example of a beam pattern with zones that are fully illuminated.

FIG. 2A illustrates top view of a beam pattern 20. The beam pattern 20 is divided into a plurality of zones. The plurality of zones include a first outer zone 22, a first middle zone 24, and a first center zone 26 that is substantially along a center of a vehicle 2 of FIG. 1. Beginning at the center of the vehicle 2, the beam pattern 20 extends in a second direction beginning at the second center zone 28, the second middle zone 30, and ending at the second outer zone 32. Each of the zones are illuminated by a combination of lights so that each of the zones may be adapted to change an amount of light within each zone.

Figure 2B:
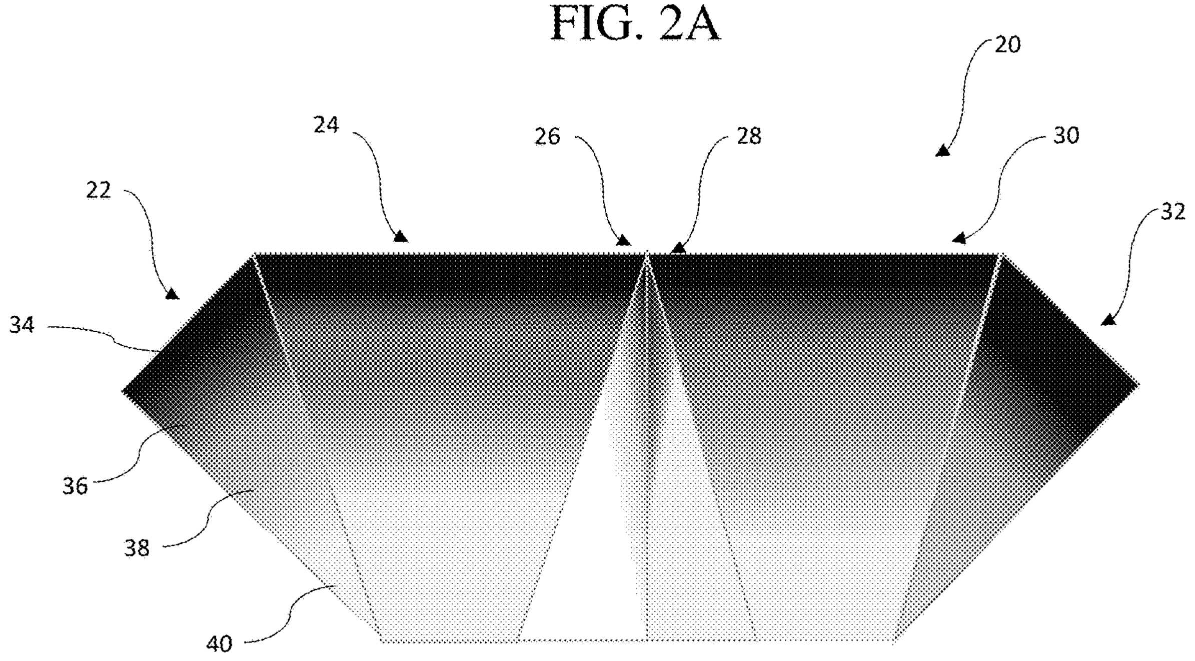
FIG. 2B illustrates an example of the beam pattern with the zones at least partially derated.

FIG. 2B illustrates the beam pattern 20 of FIG. 2A partially derated (e.g., varied to reduce a total amount of light). The first outer zone 22 and the second outer zone 32 have light reduced by largest amount. As shown, the first outer zone 22 and the second outer zone 32 are reduced substantially a same amount. The first middle zone 24 and the second middle zone 30 are reduced less than the first outer zone 22 and the second outer zone 32. The first middle zone 24 and the second middle zone 30 are reduced substantially a same amount. As shown, a furthest part of the first middle zone 24 and the second middle zone 30 are reduced before a location proximate to the vehicle 2 so that a total distance illuminated is reduced. The first center zone 26 and the second center zone 28 are reduced last if at all. As shown, only a distal end of the first center zone 26 and the second center zone 28 are reduced relative to the vehicle 2. Thus, the power usage, heat, or both are reduced by reducing a total amount of light generated within the beam pattern 20.

Figure 3A:
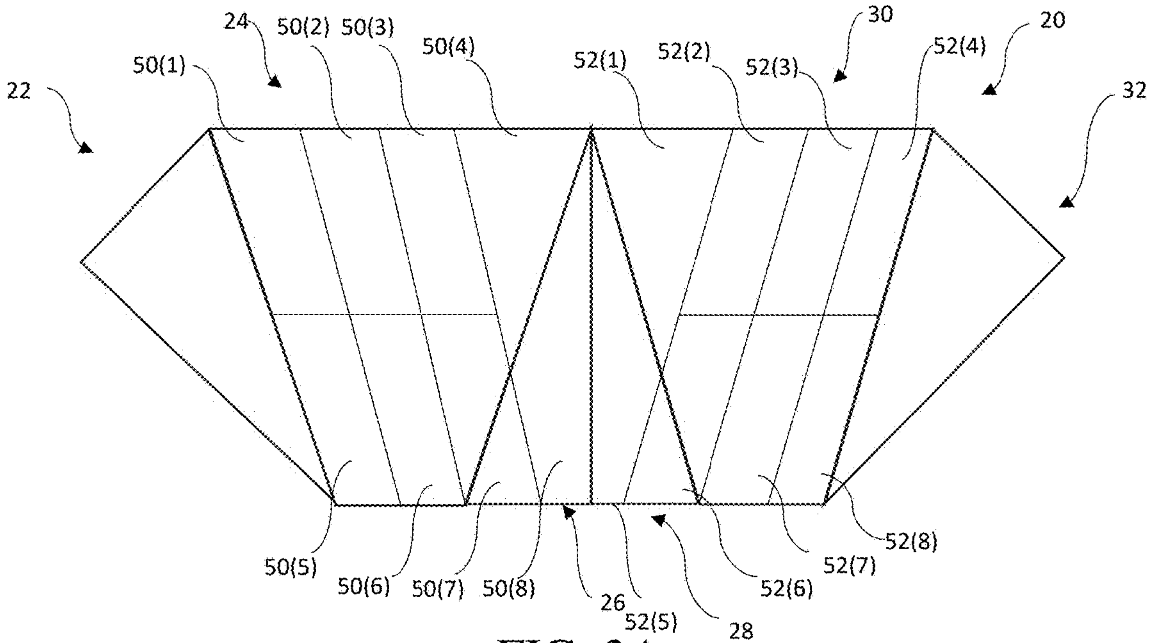
FIG. 3A illustrates an example of a beam pattern with zones and sub-zones that are fully illuminated.

FIG. 3A illustrates a beam pattern 20 divided into zones and then sub-zones. The beam pattern 20 is fully illuminated. The zones include: a first outer zone 22, a first middle zone 24, a first center zone 26, a second center zone 28, a second middle zone 30, and a second outer zone 32. The first middle zone 24 is divided into a plurality of sub-zones. The plurality of sub-zones include first sub-zone one 50(1), first sub-zone two 50(2), first sub-zone three 50(3), first sub-zone four 50(4), first sub-zone five 50(5), first sub-zone six 50(6), first sub-zone seven 50(7), and first sub-zone eight 50(8). Some of the sub-zones may extend between two zones. For example, the first sub-zone eight 50(8) may cross from the first middle zone 24 to the first center zone 26. The plurality of sub-zones include second sub-zone one 52(1), second sub-zone two 52(2), second sub-zone three 52(3), second sub-zone four 52(4), second sub-zone five 52(5), second sub-zone six 52(6), second sub-zone seven 52(7), and second sub-zone eight 52(8). Some of the sub-zones may extend between two zones. For example, the second sub-zone five 52(5) may cross from the second middle zone 30 to the second center zone 28.

Figure 3B:
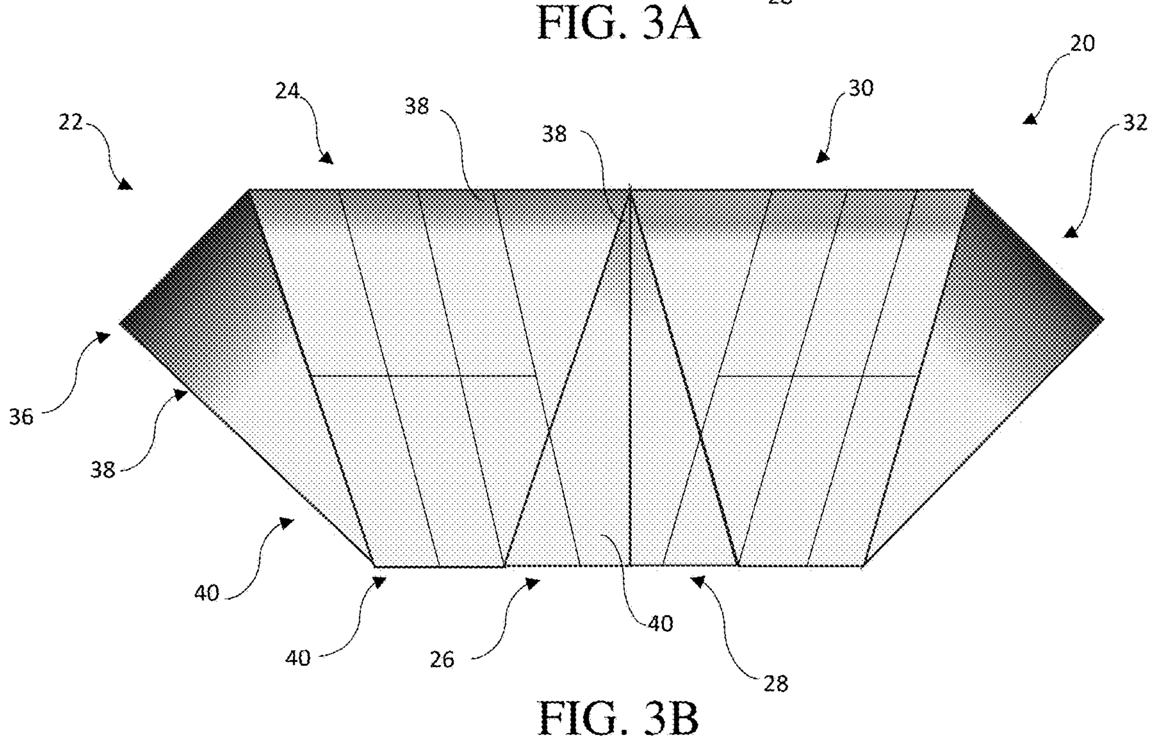
FIG. 3B illustrates the beam pattern of FIG. 3A with outer zones derated and middle zones partially derated.

FIG. 3B illustrates a first deration of the beam pattern 20 of FIG. 3A. The first outer zone 22 and the second outer zone 32 are derated first. The first middle zone 24 and the second middle zone 30 are derated second, and the first center zone 26 and the second center zone 28 are derated last. As shown, the first outer zone 22 and the second outer zone 32 are derated so that a distal end has a dark deration 36, a central portion has a light deration 38, and the proximal end has low to no deration 40. The first middle zone 22 and the second middle zone 30 are derated to a light deration 38 with the remaining amount remaining with low to no deration 40. The first center zone 26 and the second center zone 28 have a distal end that have light deration 38 with the remainder having low to no deration 40.

Figure 3C:
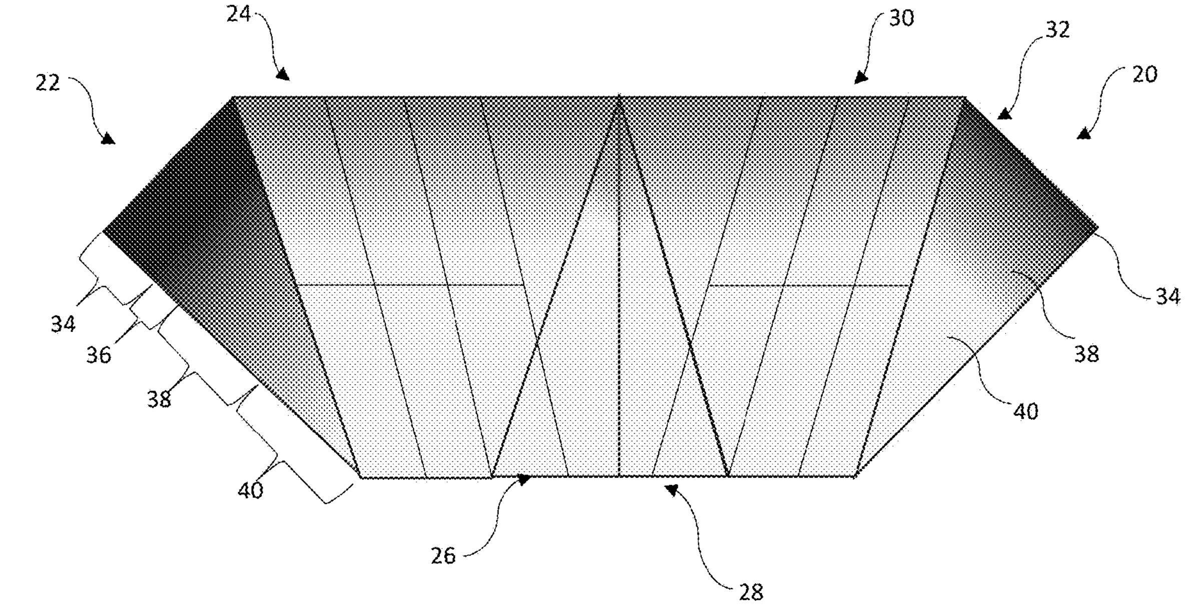
FIG. 3C illustrates the beam pattern of FIG. 3A with one outer zone derated more than an opposing outer zone.

FIG. 3C illustrates the beam pattern 20 of FIG. 3B derated a second time. A second deration may only derate the first outer zone 22, the second outer zone 32, or both. As shown only the first outer zone 22 is derated. Once the second deration occurs the first outer zone 22 has a distal end that has a full deration 34 the middle portion has a dark deration 36 proximate to the full deration 34 and a light deration 38 that transition into a low to no deration 40 at the proximal end. The remaining zones may not include any further deration beyond that of FIG. 3B.

Figure 3D:
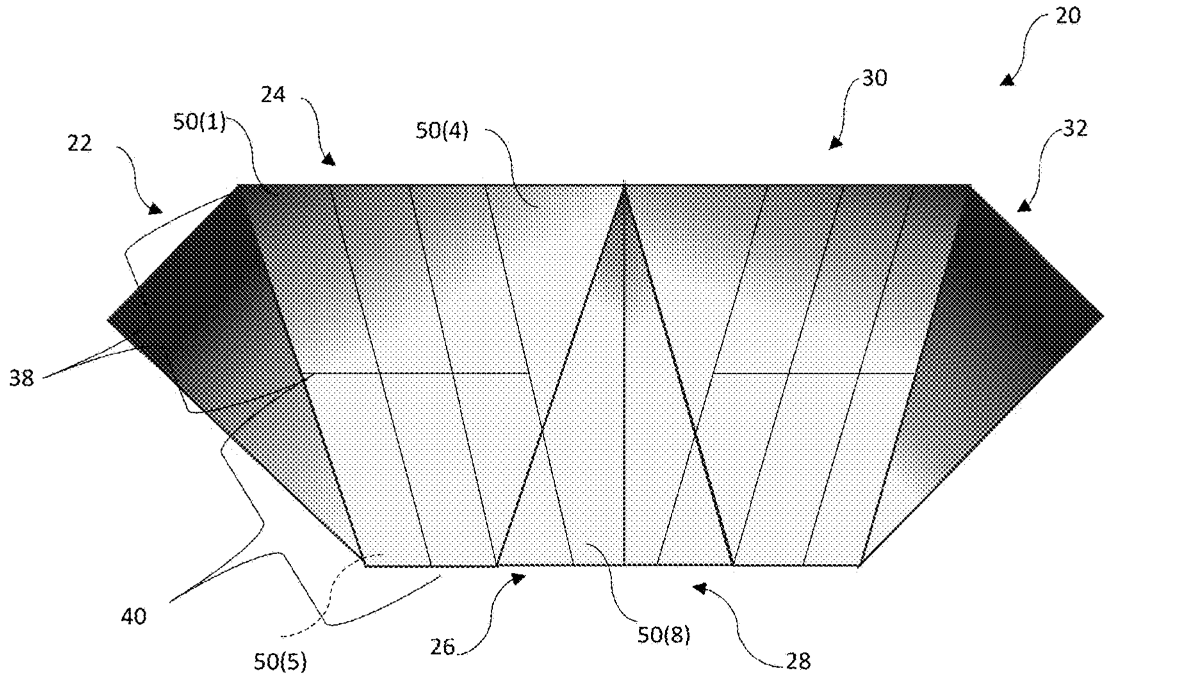
FIG. 3D illustrates the beam pattern of FIG. 3A with both outer zones derated and the middle zones derated at a distance.

FIG. 3D illustrates a further derating of the beam pattern 20 beyond that of FIG. 3C. As shown, the second outer zone 32 is derated to match the first outer zone 22. The so that the first sub-zones 50(1)-50(4) (e.g., distal end) are derated more than 50(5)-50(8) (e.g., proximal end). The sub-zone 50(1) is derated more than sub-zone 50(4) such that an area directly in front of the vehicle 2 is lightened more than the peripheral areas around the vehicle 2. As shown, the first sub-zones 50(1)-50(4) are derated in a progressively less manner with a light deration 38. For example, the first sub-zone one 50(1) has more light deration 38 than the first sub-zone four 50(4) (e.g., the first sub-zone four 50(4) has more light that has low to no deration 40.

Figure 3E:
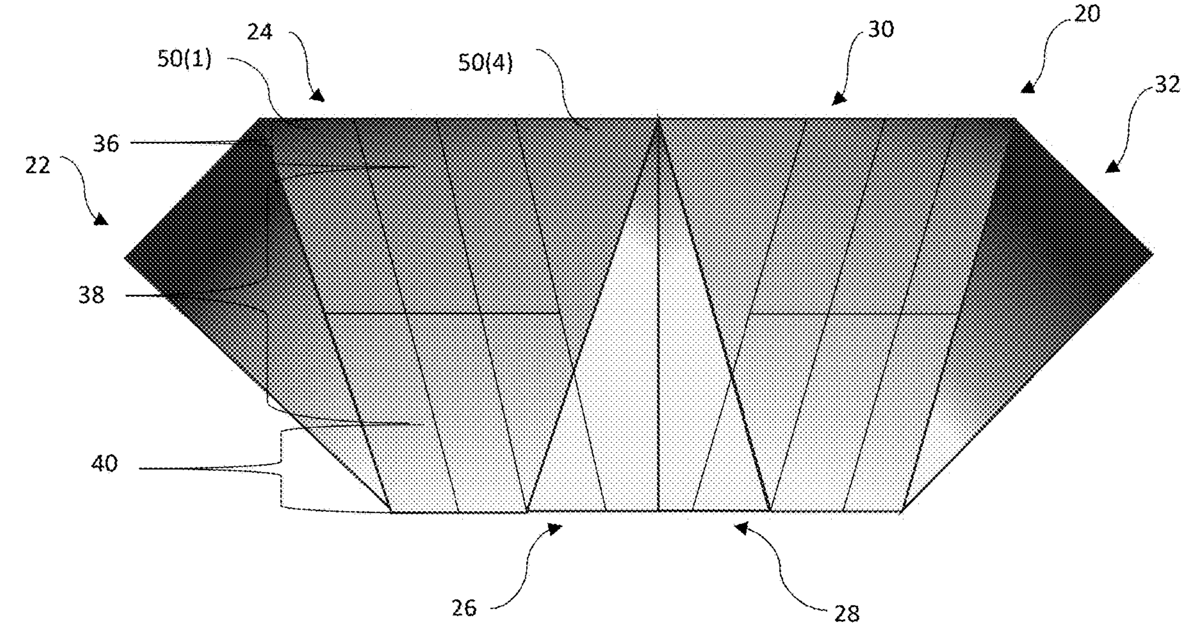
FIG. 3E illustrates the beam pattern of FIG. 3A with both outer zones derated more than FIG. 3D and the middle zones derated.

FIG. 3E illustrates further deration where the first sub-zone one 50(1) is dimmed to a dark deration 36, whereas the first sub-zone four 50(4) remains with substantially only light deration 38. Thus, as illustrated the distal ends of the zones and the proximal sides of the zones are dimmed before the regions directly in front of the vehicle 2.

Figure 3F:
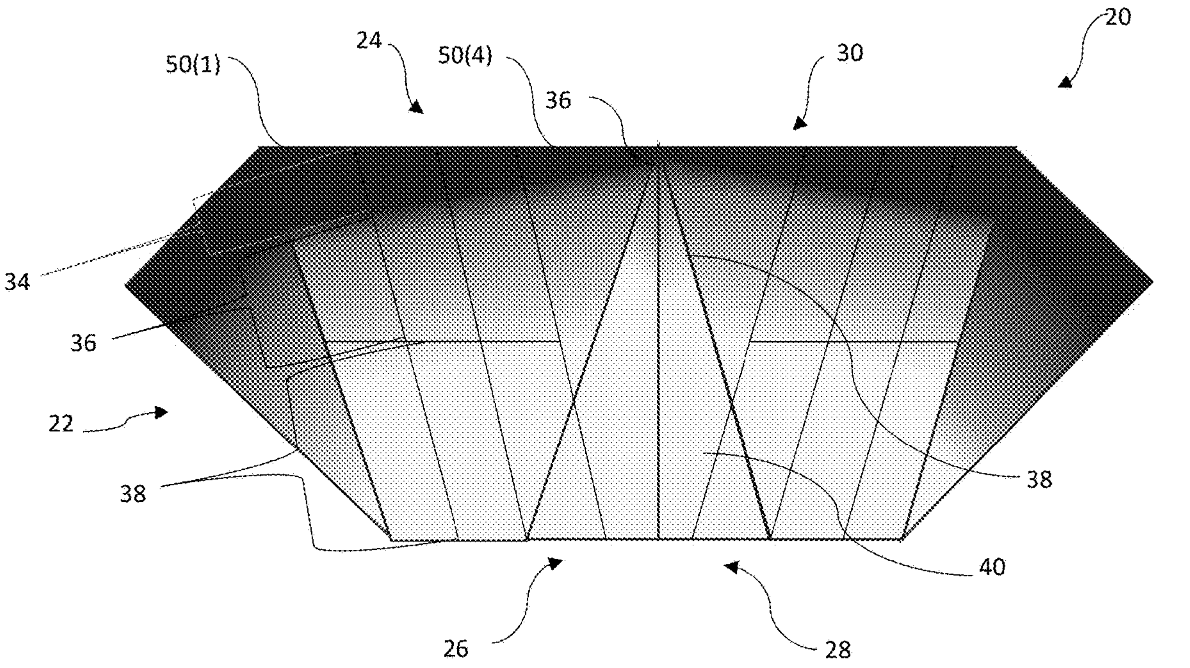
FIG. 3F illustrates the beam pattern of FIG. 3A with the outer zones derated as much as FIG. 3E and the ends of the middle zones derated.

FIG. 3F illustrates further deration of the beam pattern 20 such that the full dark deration 34 extends from the first sub-zone one 50(1) to the first sub-zone four 50(4). Further, as shown the first center zone 26 and the second center zone 28 are derated so that a distal end has a light derate 38 while the remainder towards the proximal end has light to no derate 40.

Figure 4A:
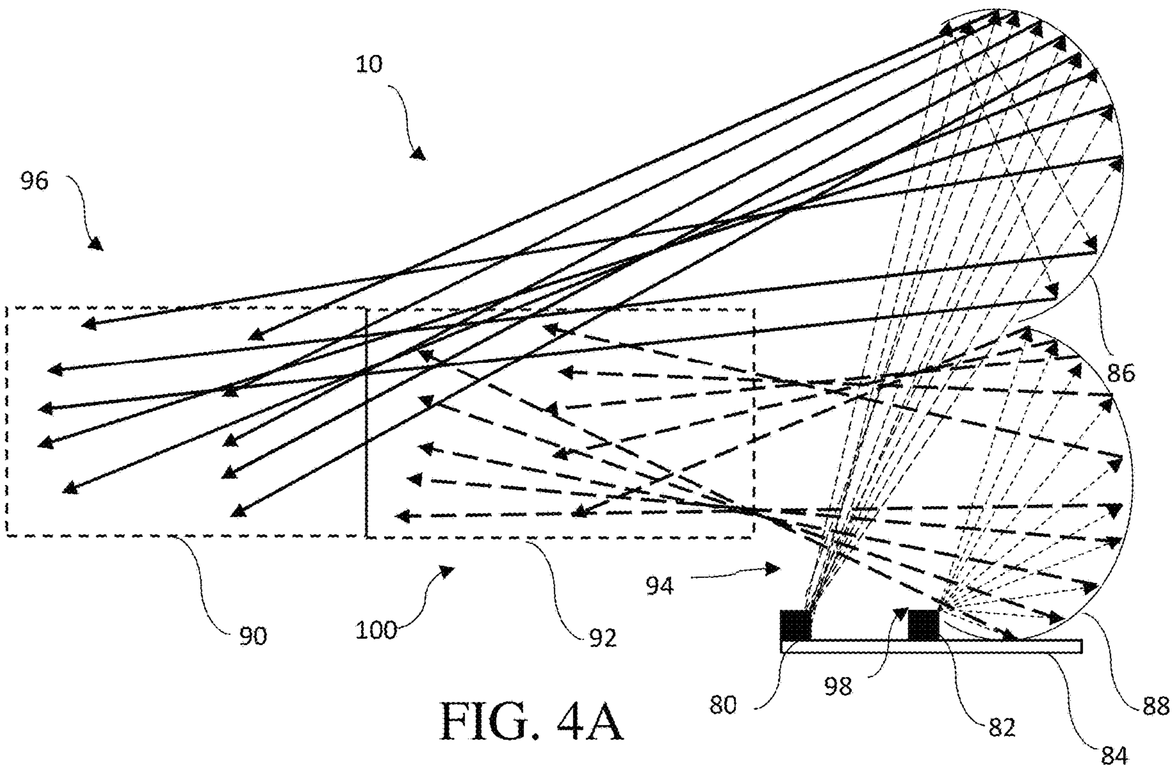
FIG. 4A illustrates lights providing a full amount of light to two zones or two sub-zoned.

FIG. 4A illustrates a light system 10 providing light around a vehicle. The light system 10 includes a first light source 80 and a second light source 82 located on a printed circuit board 84. The first light source 80 directs first direct light 94 towards a first reflector 86. The first direct light 94 contacts the first reflector 86 and is redirected as first reflected light 96 into a first zone or first sub-zone 90. As shown, the first reflected light 96 generally fills the entire first zone or the first sub-zone 90. Second direct light 98 is formed by the second light source 82 and is directed toward and into contact with the second reflector 88. The second direct light 98 is redirected from the second reflector 88 as second reflected light 100 into the second zone or a second sub-zone 92. As shown, the second reflected light 100 generally fills the entire second zone or the second sub-zone 92.

Figure 4B:
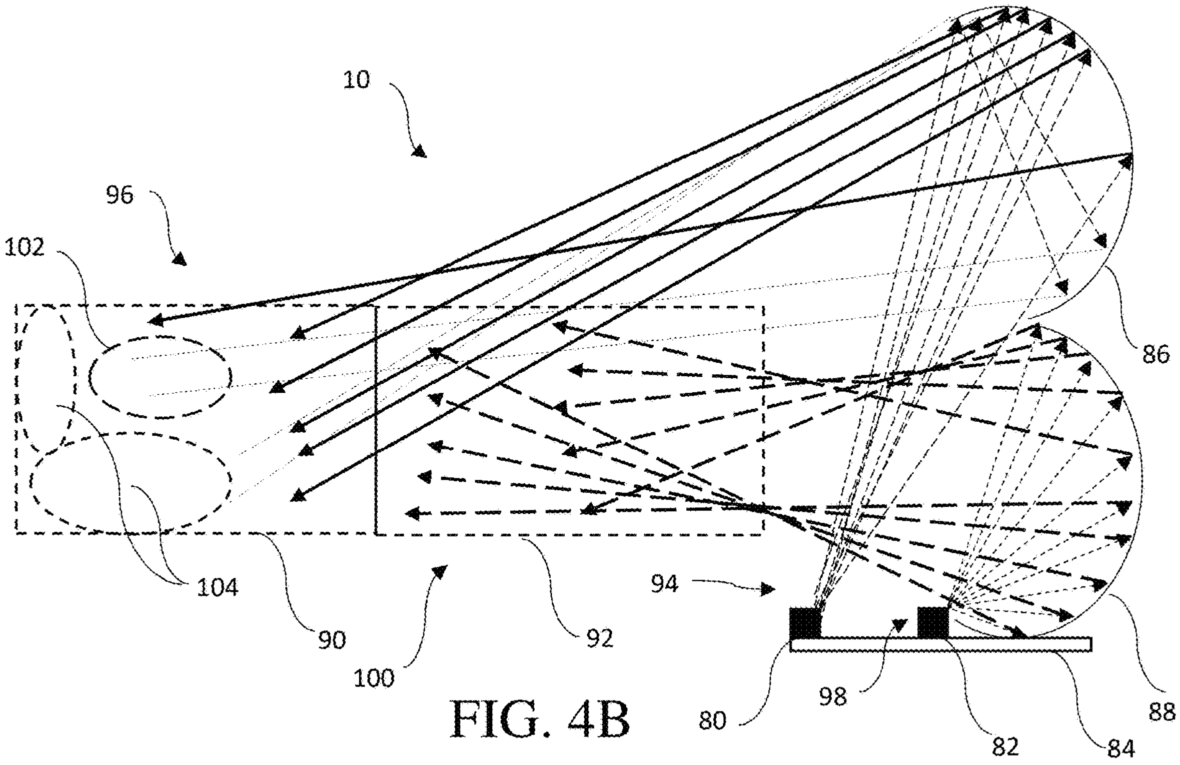
FIG. 4B illustrates the lights of FIG. 4A with a portion of a light turned off and a portion of the light reduced in power.

FIG. 4B illustrates the light system 10 of FIG. 4A with the first light source 80 derated. As shown, the first direct light 94 from the first light source 80 is directed into contact with the first reflector 86. The first light source 80 is reduced in power or partially turned off so that the first reflected light 96 no longer fills the entire first zone or first sub-zone 90. As shown, when the first light source 80 is derated the light is reduced in power and does not extend as far and/or does not provide as much light; thus, forming a reduced light region 102, a removed light region 104, or both. As shown, the second light source 82 remains unchanged so that the second zone or second sub-zone is fully illuminated so that a region proximate to a vehicle remains unchanged.

Figure 5:
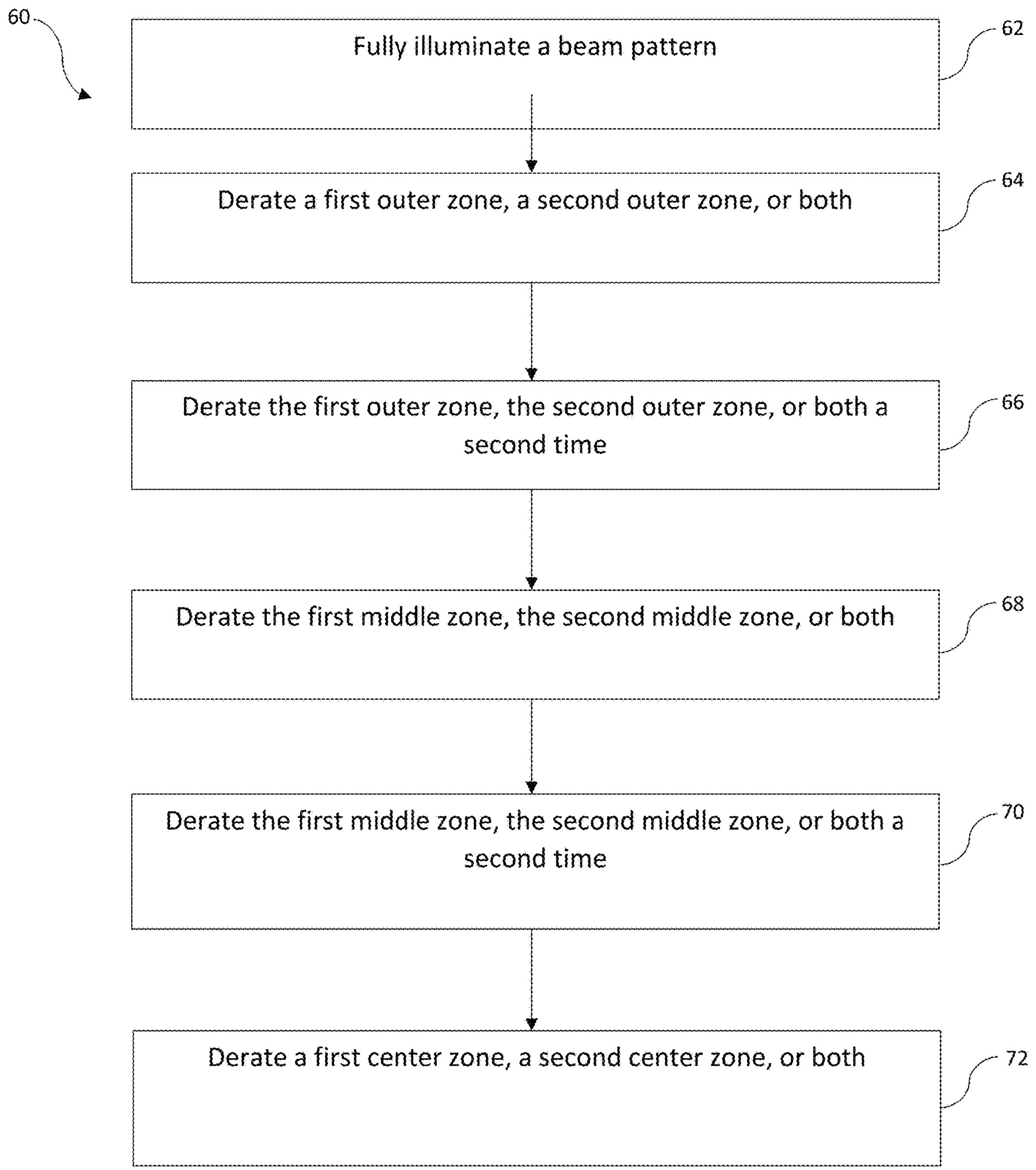
FIG. 5 illustrates a flow diagram of derating a light system.

FIG. 5 illustrates a process 60 of controlling a beam pattern 20 (e.g., FIGS. 2A-3F). Controlling 60 the beam pattern 20 may be done so that the beam pattern 20 is fully illuminated 62. The fully illuminated 62 beam pattern 20 has all of the various zones lit to a maximum power. The process 60 via a controller 8 may determine that too much power is being consumed, the light system 10 is too hot, or both and the process may perform a step 64 of derating a first outer zone 22, a second outer zone 32, or both first so that power to those respective components are reduced. The first outer zone, the second outer zone, or both may be derated from an outside in (e.g., from an exterior of the illuminated region toward a center of the illuminated region). The first outer zone, the second outer zone, or both may be derated proportionally, disproportionally, on an angle relative to a distal portion and a proximal portion, or a combination thereof. The deration may occur so that the first outer zone, the second outer zone, or both are decreased by a predetermined amount (e.g., about 5 percent or more, 10 percent or more, 15 percent or more, or 40 percent or less).

The process 60 may determine that the temperature is still too high, the amount of current used is too high, or both. The process 60 may perform a step 66 of derating a second time so that the first outer zone, the second outer zone, or both are derated during the second deration. If only the first outer zone is derated, the second outer zone may then be derated so that the first outer zone and the second outer zone are illuminated a same amount. If both the first outer zone and the second outer zone are derated in step 66 then the first outer zone, the second outer zone, or both may be reduced by a second amount. The second amount may vary the amount of light by about 5 percent or more, 10 percent or more, 15 percent or more, or 40 percent or less.

The process 60 may determine that a second time of derating, step 66, does not reduce the temperature, the current, or both enough so the process 60 may perform a step 68 of derating the first middle zone, the second middle zone, or both. The step 68 may derate from a distal end (e.g., a farthest distance from the vehicle towards the vehicle) towards a proximal end. The step 68 may derate from an outside towards an inside (e.g., a location outside of the vehicle towards a center of the vehicle). The step 68 may derate the about of light by about 5 percent or more, 10 percent or more, 15 percent or more, or 40 percent or less.

If the process 60 determines that the deration in the step 68 is not sufficient to reduce the heat, the current, or both then the process 60 may perform a step 70 of derating a second time. The step 70 of derating a second time may include derating the first middle zone, the second middle zone, or both a second time. The step 70 may derate the beam pattern 20 in a same manner as the step 68 (e.g., front to back and outside to inside). The step 70 may reduce the amount of light by a same amount as the step 68. The light reduction may be a gradient light reduction with the largest light reduction being at a distal outside and a least light reduction being at a proximal center relative to a vehicle 2.

If the process 60 determines that the deration in step 70 is not sufficient to reduce the heat, the current, or both of the light system 10 to a predetermined range, then a step 72 of derating another time may be performed. Step 72 derates a first center zone, a second center zone, or both of the beam pattern 20. The first center zone and the second center zone are back to back, align along a center line of the vehicle, or both. The first center zone, the second center zone, or both may derate (e.g., be reduced) from a distal end towards a proximal end, an outside towards an inside, or both. Step 72 may be the final step of derating. Once step 72 is performed a total amount of light reduced by the light system may be about 10 percent or more, about 15 percent or more, about 20 percent or more, or about 25 percent or less.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of or even consists of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

ELEMENT LIST

2 Vehicle
4 Fore
6 Aft
8 Controller
10 Light System
14 Outer Lens
16 Direction of Motion
18 Light Direction
20 Beam Pattern
22 First Outer Zone
24 First Middle Zone
26 First Center Zone
28 Second Center Zone

30 Second Middle Zone
32 Second Outer Zone
34 Full Derate
36 Dark Derate
38 Light Derate
40 Low to no Derate
50 First Sub-Zones
52 Second Sub-Zones
60 Process of Controlling a Light
62 Fully Illuminated.
64 First Derate
66 Second Derate
68 First Derate
70 Second Derate
72 Derate Center Zone
80 First Light Source
82 Second Light Source
84 Printed Circuit Board
86 First Reflector
88 Second Reflector
90 First Zone/Sub-Zone
92 Second Zone/Sub-Zone
94 First Direct Light
96 First Reflected Light
98 Second Direct Light
100 Second Reflected Light
102 Reduced Light Region
104 Removed Light Region

I claim:

1. A light system comprising:

a plurality of light sources configured to generate light that when located within a vehicle form a beam pattern; and a controller in communication with the plurality of light sources and configured to control the plurality of light sources;

wherein the beam pattern is divided into two or more zones and the controller is configured to derate one or more of the plurality of light sources so that the beam pattern is changed by the controller derating the one or more of the plurality of light sources by a predetermined amount to reduce an amount of light produced so that an amount of power and/or an amount of current are reduced to vary current consumed, heat produced, or both;

wherein the two or more zones comprise:

a first outer zone that extends in a first direction that is outward relative to the light sources, the first outer zone is formed by two or more light sources of the plurality of light sources and at least one of the plurality of light sources are derated by the controller;

a first center zone that extends in a second direction that is directly forward to the light sources; and a first middle zone that extends in a third direction that is located between the first outer zone and the first center zone; and wherein the predetermined amount is about 0.1 percent or more and about 5 percent or less relative to an amount of current when the plurality of light sources are free of being derated.

2. The light system of claim 1, wherein the beam pattern upon being derated is not visible to a naked eye of a user.

3. The light system of claim 1, wherein the two or more zones further comprise:

a second outer zone that extends in a fourth direction that is outward relative to the light sources on an opposing side of the beam pattern from the first outer zone, the second outer zone being formed by two or more light sources of the plurality of light sources; and wherein the controller is configured to derate the first outer zone by a first predetermined amount and derate the second outer zone by a second predetermined amount different from the first predetermined amount, such that the beam pattern is asymmetrically derated to reduce the amount of power and/or the amount of current on the first side of the beam pattern differently than on the opposing second side of the beam pattern.

4. The light system of claim 1, wherein the controller is configured to derate the first outer zone before the first center zone and the first middle zone.

5. The light system of claim 4, wherein the first middle zone is derated before the first center zone.

6. The light system of claim 1, wherein the controller is configured to derate the one or more of the plurality of light sources at a rate that varies depending on a rate of change of a temperature of the light system, an amount of current used over a predetermined amount, or both, such that the rate of derating is non-linear when the temperature is rising non-linearly.

7. The light system of claim 1, wherein the controller is further configured to measure a temperature of the light system and change a rate at which the one or more of the plurality of light sources are derated based on the measured temperature, wherein the rate at which the one or more of the plurality of light sources are derated increases as the measured temperature increases.

8. A light system comprising:

one or more first reflectors;

one or more first light sources configured to direct light at the one or more first reflectors to direct light into a first zone or a first sub-zone;

one or more second reflectors;

one or more second light sources configured to direct light at the one or more second reflectors to direct light into a second zone or a second sub-zone; and a controller configured to:

provide current to the one or more first light sources and the one or more second light sources of the light system so that a beam pattern including the first zone or the first sub-zone and the second zone or the second sub-zone are formed around a vehicle that houses the light system;

measure a current or temperature of the light system; and derate the one or more first light sources so that a shape of the beam pattern in the first zone or the first sub-zone, a brightness of the beam pattern in the first zone or the first sub-zone, or both is reduced relative to the second zone or the second sub-zone, wherein the second zone or the second sub-zone is located proximate to the vehicle relative to the first zone or the first sub-zone.

9. The light system of claim 8, wherein the beam pattern further comprises:

an outer zone;

a middle zone; and a center zone.

10. The light system of claim 9, wherein the controller derates the outer zone before the middle zone and the center zone.

11. The light system of claim 10, wherein the middle zone is derated before the center zone.

12. The light system of claim 10, wherein the middle zone is divided into the first sub-zone and the second sub-zone that are adjustable by the controller.

13. The light system of claim 9, further comprising:
a centerline dividing the beam pattern into two sides, wherein each of the two sides comprise:
one of the center zones, one of the middle zones, and one of the outer zones.

14. A process comprising:
generating a beam pattern with a plurality of lights within a light system of a vehicle, the beam pattern comprising:
a first zone or a first sub-zone, and
a second zone or a second sub-zone; and
derating one or more of the plurality of lights so that a shape of the beam pattern, a brightness of the beam pattern, or both in the first zone or the first sub-zone are changed by a predetermined amount to reduce an amount of light produced so that an amount of power and/or an amount of current are reduced to vary current consumed, heat produced, or both; and
sequentially derating the light system until temperature of the light system stabilizes or drops below a predetermined maximum temperature;
wherein some of the plurality of lights remain unchanged so that the second zone or the second sub-zone remains unchanged when one or more of the plurality of lights are derated.

15. The process of claim 14, the beam pattern comprises:
a plurality of zones that comprise the first zone and the second zone, wherein the plurality of zones are each individually controllable by controlling the plurality of lights.

16. The process of claim 15, further comprising:
a plurality of sub-zones within each of the plurality of zones, the plurality of sub-zones comprising the first sub-zone and the second sub-zone, wherein the second sub-zone is located proximate to the vehicle relative to the first sub-zone.

17. The process of claim 15, wherein the plurality of zones comprise:
one or more center zones;
one or more middle zones, and
one of more outer zones that are derated before the one or more center zones and the one or more middle zones.

18. The process of claim 17, wherein the one or more outer zones are the first zone and the one or more outer zones are derated from an outside towards the one or more middle zones, which are the second zone, and towards the one or more center zones, and from a distal end towards a proximal end relative to the light system.

19. The process of claim 14, wherein the change of the shape of the beam pattern, the brightness of the beam pattern or both is not visible to a naked eye of a user of the light system.

20. The process of claim 14, wherein derating the one or more of the plurality of lights comprises:
sequentially derating through a low deration, a light deration, a dark deration, and a full deration,
wherein the low deration reduces an amount of light by about 1 percent or more and about 10 percent or less, the light deration reduces an amount of light by about 15 percent or more and about 35 percent or less, the dark deration reduces an amount of light by about 30 percent or more and about 60 percent or less, and the full deration reduces an amount of light by about 50 percent or more and about 90 percent or less.

* * * * *